US009067638B2

(12) United States Patent
Segato et al.

(10) Patent No.: US 9,067,638 B2
(45) Date of Patent: Jun. 30, 2015

(54) HANDGRIP FOR BICYCLE HANDLEBARS

(75) Inventors: Stefano Segato, Vicenza (IT); Vincent Bourgeois, Bassano del Grappa (IT)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 185 days.

(21) Appl. No.: 13/697,631

(22) PCT Filed: Mar. 29, 2011

(86) PCT No.: PCT/IB2011/051317
§ 371 (c)(1),
(2), (4) Date: Dec. 19, 2012

(87) PCT Pub. No.: WO2011/141828
PCT Pub. Date: Nov. 17, 2011

(65) Prior Publication Data
US 2013/0104692 A1 May 2, 2013

(30) Foreign Application Priority Data

May 13, 2010 (IT) .............................. VR2010A0103

(51) Int. Cl.
*B62K 21/26* (2006.01)
(52) U.S. Cl.
CPC ........... *B62K 21/26* (2013.01); *Y10T 74/20828* (2015.01)
(58) Field of Classification Search
USPC ............... 74/525, 551.8, 551.9, 558.5, 551.1, 74/551.3; 16/421, 429; 30/162; 473/296, 473/552
See application file for complete search history.

(56) References Cited

U.S. PATENT DOCUMENTS

| 3,400,558 | A | * | 9/1968 | Haines | 464/162 |
| 4,308,762 | A | | 1/1982 | Jannard | |
| 4,641,838 | A | * | 2/1987 | Gabrielidis | 473/552 |
| 5,154,094 | A | * | 10/1992 | Klieber | 74/551.1 |
| 5,163,339 | A | * | 11/1992 | Giard et al. | 74/551.3 |
| 7,866,002 | B2 | * | 1/2011 | Wang | 16/421 |
| 2003/0233904 | A1 | | 12/2003 | Cohen et al. | |

FOREIGN PATENT DOCUMENTS

| DE | 150513 | 5/1903 |
| DE | 688541 | 2/1940 |
| DE | 29817257 | 1/1999 |
| FR | 870862 | 3/1942 |
| FR | 1221709 | 6/1960 |
| WO | WO9824395 | 6/1998 |

\* cited by examiner

*Primary Examiner* — Thomas Diaz
(74) *Attorney, Agent, or Firm* — Tutunjian & Bitetto, P.C.

(57) ABSTRACT

A handgrip for handlebars of a bicycle or similar vehicles includes a tubular group, which extends according to an axial direction (X) corresponding to the axis of the handlebars, the group being fitted onto an end of handlebars, the handgrip including padding means associated with the tubular group, means for attaching the handgrip to the handlebars, the tubular group including an inner body suitable for being fitted onto an end of the handlebars and a second outer body slidably fitted according to the direction (X) onto the inner body so as to adjust the axial length of the handgrip.

32 Claims, 4 Drawing Sheets

HANDGRIP FOR BICYCLE HANDLEBARS

TECHNICAL FIELD OF THE INVENTION

The present invention concerns a handgrip for handlebars of a bicycle.

In general, as well as use in handlebars of two or three-wheeled vehicles, the handgrip according to the present invention can be used in sports and non-sports devices, for example trekking poles, walking sticks, etc., and in all devices that require a handgrip suitable for discharging a high stress coming from the user's hand.

DESCRIPTION OF RELATED ART

Handgrips with portions of extended support for the user's hand for use in handlebars of a bicycle or of a similar vehicle or for use in other similar devices are known for example from documents U.S. Pat. No. 4,308,762, FR1221709, DE688541, WO9824395, FR870862.

In these documents handgrips are presented comprising substantially wing-like portions for extended support of the palm of the user's hand and so as to transmit the stresses, in particular the weight bearing down on the hand, over a wider surface.

These handgrips have the drawback of being difficult to adapt to the user's hand both in terms of the dimension and the attachment to the handlebars, and in terms of the elastic and damping characteristics of the handgrip.

SUMMARY OF THE INVENTION

A purpose of the invention is to improve the state of the art.

Another purpose of the present invention is to have a handgrip with improved elastic and damping characteristics.

Another purpose of the present invention is to have a handgrip with the possibility of size adaptation.

Another purpose of the present invention is to have a handgrip that is more comfortable than the handgrips of the known state of the art because it has a better distribution of the contact pressures with the user's hand.

Another purpose of the invention is to have a handgrip that allows a more secure angular adjustment of the attachment to the handlebars.

In accordance with an aspect of the present invention, these purposes are solved by a handgrip according to what is specified in the present specification.

These and other purposes are accomplished by the dependent claims that refer to preferred and advantageous embodiments of the invention.

BRIEF DESCRIPTION OF THE DRAWINGS

Further characteristics and advantages of the invention will become clearer from the detailed description of a handgrip, illustrated for indicating and not limiting purposes, in the attached drawings, in which.

DETAILED DESCRIPTION OF PREFERRED EMBODIMENTS

Figure 1:
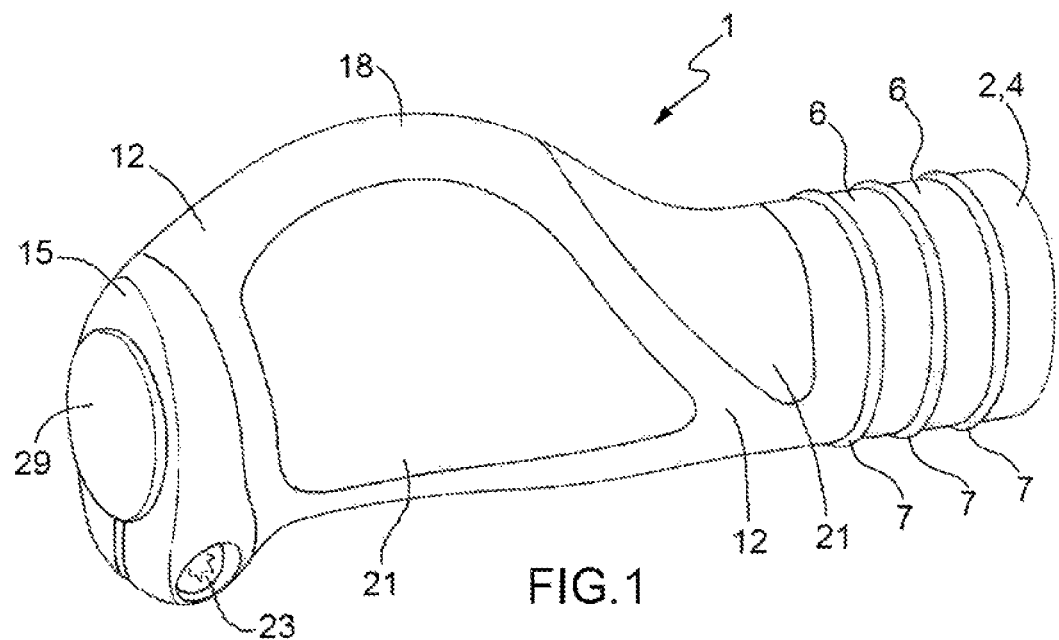
FIG. 1 is a top perspective view of a handgrip according to the present invention.

For the sake of simplicity of presentation hereafter we will refer to a handgrip for bicycle handlebars, with the understanding that it can also be used for any other type of vehicle with handlebars and even for grips and handles for devices of whatever type, sporting or otherwise.

With reference to the figures, reference numeral 1 indicates a handgrip for handlebars that comprises an inner body 2, made from relatively rigid material, having a substantially tubular shape with a longitudinal axis "X", suitable for being fitted onto an end of handlebars (not illustrated) or of a similar element, for example a grip, a handle, etc. The tubular inner body 2 can be made from any rigid and semi-rigid material, metal or plastic, for example a thermoplastic polymer, for example polypropylene.

A tubular outer body 3 in slidably fitted, according to the axis "X", onto the tubular inner body 2, said tubular outer body 3 being substantially similar to the tubular inner body 2, apart from the greater dimensions of the internal cavity that allow it to be fitted onto the body 2.

The assembly formed by the inner body 2 and by the outer body 3 constitutes a telescopic group that allows the axial length of the handgrip 1 to be adjusted.

The inner body 2 comprises a neck 4 that determines an abutment for the axial movement of the outer body 3. Between the neck 4 and the end 5 of the outer body 3, which can go into abutment on the neck 4, some spacer rings 6 with an external shape similar to the neck 4 can be inserted, which allow the different lengths of the handgrips to be obtained, which usually are roughly between 100 mm and 140 mm.

Between the neck 4, the end 5 of the outer body 3 and each spacer ring 6 it is possible to insert gaskets 7, which can for example be O-rings.

Figure 2:
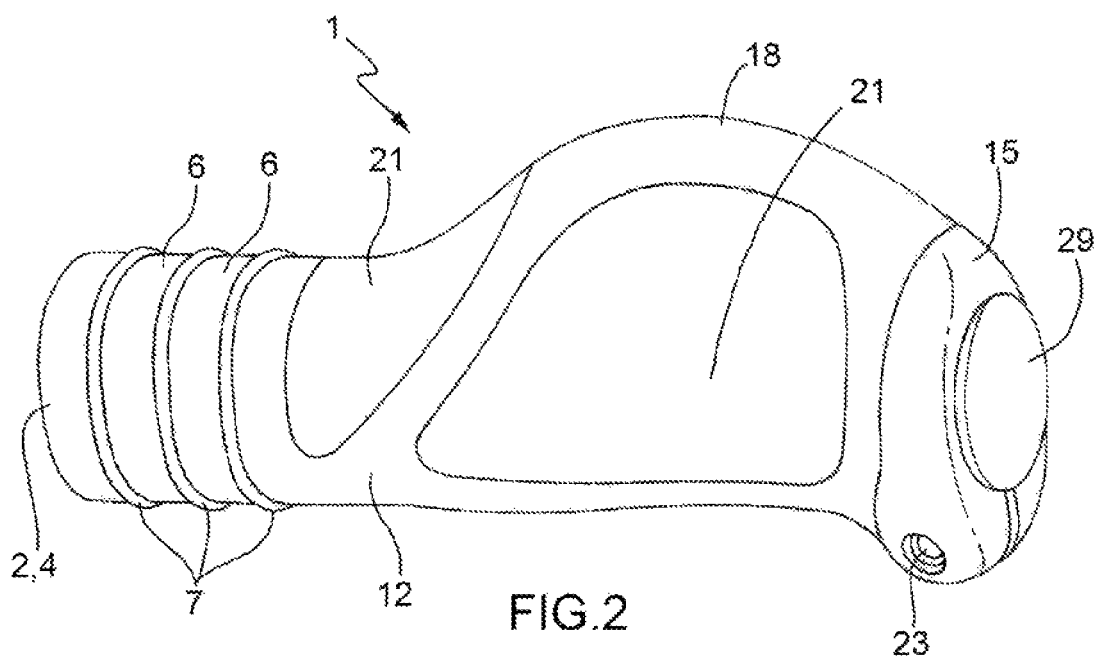
FIG. 2 is a bottom perspective view of the handgrip according to FIG. 1.
Figure 3:
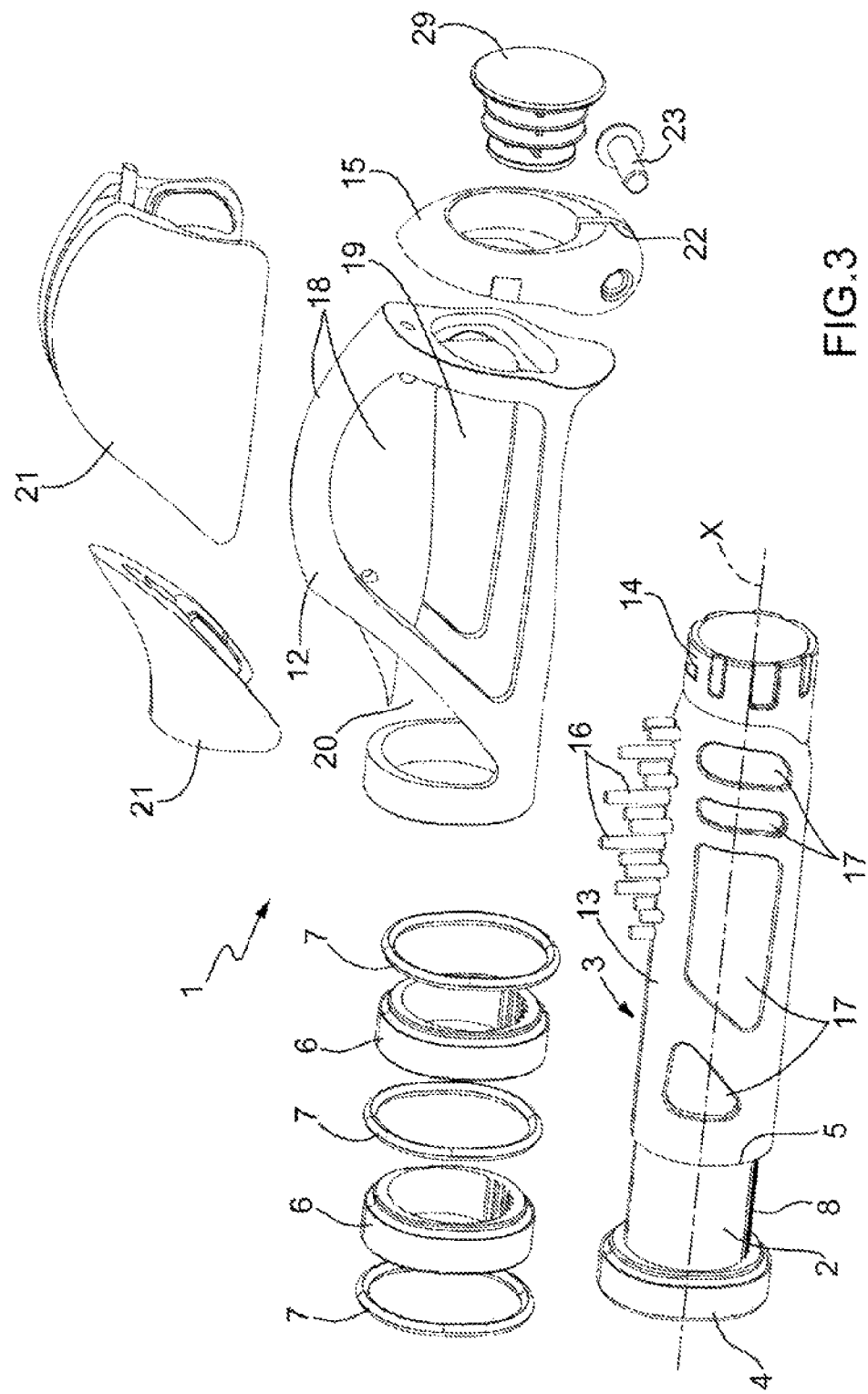
FIG. 3 is an exploded perspective view of the handgrip according to the previous figures.

As a non-limiting example it is possible to consider that to obtain handgrip of minimum length, i.e. about 100 mm, the bodies 2 and 3 are in abutment, with each other with the respective neck 4 and end 5, without any spacer ring 6, to obtain a handgrip of intermediate length, i.e. about 120 mm, a spacer ring 6 is inserted between the neck 4 and the end 5 of the outer body 3, and to, obtain a handgrip of maximum length, i.e. about 140 mm, two spacer rings 6 are inserted between the neck 4 and such an end 5, this last version being the one illustrated in FIGS. 1-3.

The material of the neck 4 and of the spacer rings 6 can be at least partially of the soft type suitable for coming into contact with the user's hand.

In order to avoid a mutual rotation between the bodies 2 and 3 it is possible to foresee matching sliding means, i.e. one or more matching longitudinal grooves 8, 9 respectively arranged on the outer cylindrical surface of the inner body 2 and on the inner cylindrical surface of the outer body 3, which allow sliding according to the axis "X" of the outer body 3 on the inner body 2, but do not allow rotation.

Figure 5:
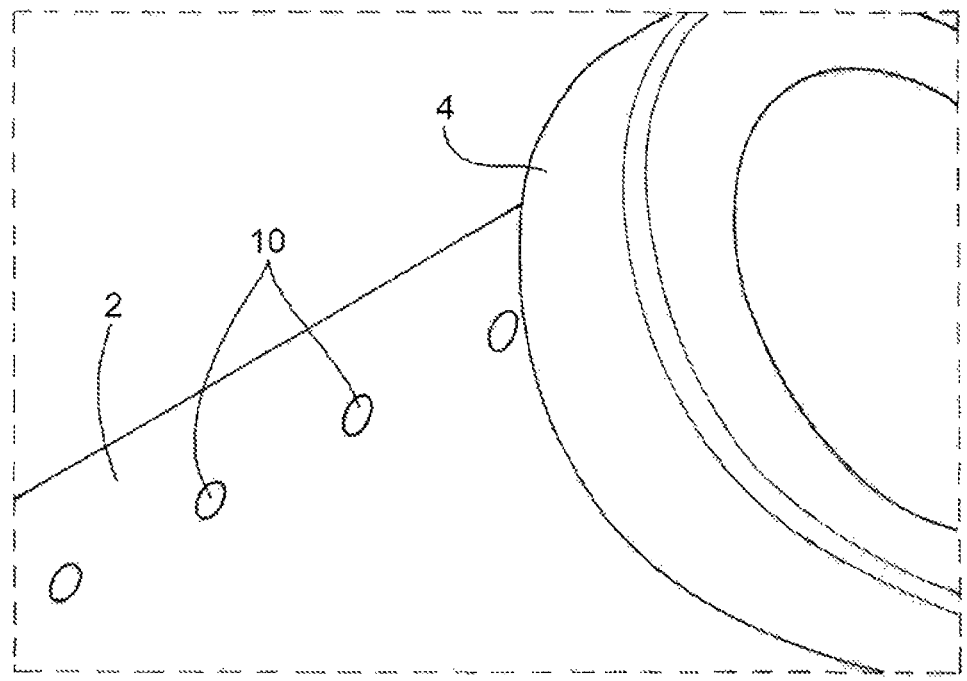
FIGS. 5 and 6 illustrate enlarged perspective views of other details of the handgrip according to the previous figures.
Figure 6:
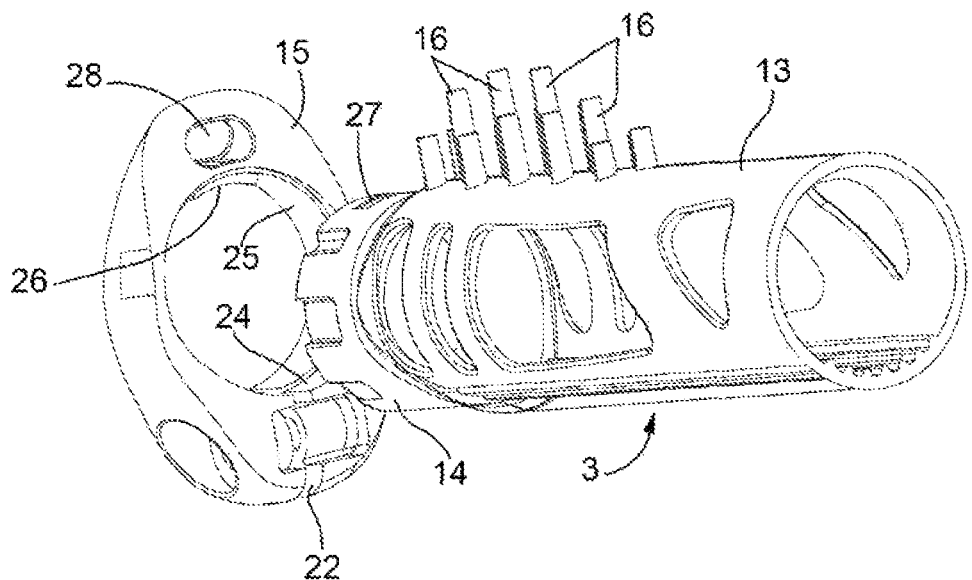

Moreover, according to what is illustrated in detail in FIG. 5, on the outer cylindrical surface of the inner body 2 there can be provided a series of cavities 10, at predetermined distances, matching respective protuberances (not illustrated) foreseen on the inner cylindrical surface of the outer body 3. In this way, it is possible to obtain a stepped axial reference, corresponding to the predetermined distances of the cavities 10, of the outer body 3 with respect to the inner body 2. The cavities 10 of the inner body 2 can be replaced by holes or protuberances that have corresponding elements protuberances or holes (not illustrated)—of the outer body 3.

The outer body 3 is mounted over the inner body 2, said outer body 3 being made from relatively rigid material and acting as a fastener for at least one first padding 12.

The outer body 3 comprises a first tubular part 13 inserted on the body 2 and a second tubular end part 14, with a smaller diameter, suitable for being internally in contact with the tube of the handlebars (not illustrated) of the bicycle and externally with an attachment ring 15, according to what will be described hereafter.

The outer body 3 comprises one or more shaft-shaped bodies 16 arranged along one or more generatrices of the first tubular part 13.

The shaft-shaped bodies 16 extend in a substantially radial direction with respect to the first tubular part 13 of the outer body 3 and can have a different length and shape. For example, they can have a cylindrical shape—as illustrated in the figures—or else a conical, prismatic, or any other elongated shape.

In particular, the shaft-shaped bodies 16 can be substantially perpendicular to the surface of the first tubular part 13 of the outer body 3.

Figure 4:
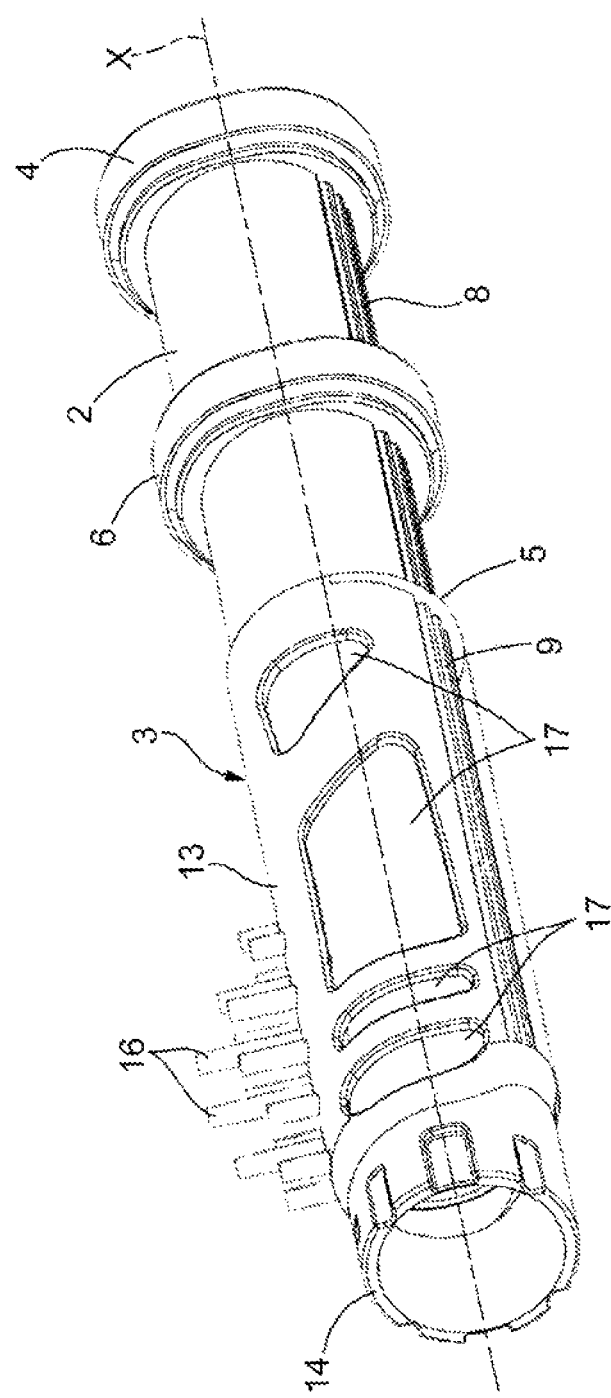
FIG. 4 is a perspective view of some details of the handgrip according to the previous figures.

The first tubular part 13 of the outer body 3 also comprises one or more windows 17 that extend in the axial and circumferential direction and one or more longitudinal grooves 9 suitable for coupling with corresponding grooves 8 of the outer surface of the inner body 2 and that in FIG. 4, for greater clarity and simplicity, have been reproduced, the same as the outer grooves 8.

The outer, body 3 can be made from any rigid and semirigid material, for example a thermoplastic polymer, such as polypropylene, or from other plastic or metallic materials of similar strength and lightness. The at least one first padding 12 comprises a widened portion 18 that extends radially with respect to the tubular bodies 2 and 3, and which acts as an extended support for the user's hand.

The at least one first padding 12 can be made from a relatively hard rubber, for example with a Shore A hardness of about 50, to provide a good support for the user's hand.

This rubber may need to not exceed certain thicknesses of material, for example in the widened portion 18, whereas in the area closest to the handlebars the thickness of the at least one first padding 12 could be insufficient to provide comfortable support.

Therefore, the shaft-shaped bodies 16 and the windows 17 allow the thickness of the material of the at least one first padding 12 to be adjusted.

With high thicknesses, the material of the at least one first padding 12 could be subject to defects, like holes or depressions due to the shrinking of the material, and the weight of the material could also be excessive. The shaft-shaped bodies 16 thus allow the thickness of the at least one first padding 12 to be decreased in the widened portion 18 and allow the handgrip 1 to be lightened overall so that the material of the outer body 3 can be less heavy than the material of the at least one first padding 12.

According to what has been illustrated in the figures, and in particular in FIG. 3, the at least one first padding 12 comprises openings 19-20 that allow at least one second padding 21 to be received. The windows 17 in the area closest to the handlebars allow the thickness of the at least one second padding 21 to be increased and therefore there is a greater support comfort for the user's hand to grip.

The at least one second padding 21 can be made from softer material, for example from a thermoplastic polymer or gel, for example a polyurethane gel even of the transparent type, or else from other materials suitable for this purpose.

For example, non-foamed or foamed materials can be used, such as thermoplastic elastomers, silicone, compact elastomeric polyurethane (PU), microcellular polyurethane, foamed ethyl vinyl acetate (EVA), etc. Such an at least one second padding 21 can also be made with continuous heterogeneous materials, like for example mixtures of gel and cork, gel and phase-change materials, etc., as well as discontinuous homogeneous materials like, for example, bags of microspheres free to run over one another and to adapt perfectly to the shape of the hand and to the external stresses, a layer of gel arranged on top of a layer of polyurethane or ethyl vinyl acetate foam, etc.

The at least one second padding 21, which is mainly located in the area of the widened portion 18 and in the tapered area of the widened portion 18 with the cylindrical part of the handgrip, can have a profile configured to promote a good grip and good comfort for the user. The at least one second padding 21 can be obtained by casting or injecting the material of the padding on the at least one first padding 12 in a mold (not illustrated) in which the aforementioned at least one first padding 12 including the outer body 3 is housed. Once set, the material of the at least one second padding 21 connects to the at least one first padding 12.

According to a version of the present invention, the at least one second padding 21 can be in part or completely made from transparent material or else it can comprise a window made from transparent material. Thanks to this transparent part the at least one second padding 21 can allow the areas underneath to be seen.

Such externally visible areas can have graphical elements, and/or drawings, and/or writing, and/or ornamental elements, and/or coloring etc., which give particular and individualizing characteristics to the handgrip itself.

The at least one first padding 12 and the at least one second padding 21 can each comprise one or more types of padding, with similar or differing hardness characteristics.

The means for attaching the handgrip to the handlebars of the bicycle comprise an attachment ring, comprising a notch, and locking means including screw means.

That is, the attachment ring 15 of the handgrip 1 comprises a notch 22 that, through locking means 23, for example screw means or equivalent means, allows the internal diameter of the ring 15 itself to be reduced so as to fix it to the handlebars according to what is explained hereafter. The attachment ring 15 comprises a first inner surface 24 and a second inner surface 25, with a smaller diameter, suitable for coupling with the end 14 of the outer body 3. The second inner surface 25 can be configured so as to cover the end 14 of the outer body 3 and, for reasons of appearance and safety, the peripheral edge of the handlebars tube.

In order to angularly and axially relate the attachment ring 15 with the handgrip 1, the attachment ring 15 can comprise an inner protuberance: for example, the inner surface 24 of the attachment ring comprises a rib 26 substantially arranged along a certain arc of circumference, which inserts in a corresponding slot or recess 27 suitably foreseen in the outer body 3.

Overall, the attachment between handgrip 1 and handlebars tube is very safe, whilst being easy to carry out by the user.

The attachment ring 15 can be made from metal, for example steel, aluminum, etc., or else from polymeric material, for example thermoplastic or thermosetting materials reinforced with fibers, balls, nano-charged materials, composite materials such as fiberglass, resins with carbon fibers or aramid fibers, etc.

The attachment ring 15 can also comprise thinning means 28 in a position substantially diametrically opposite the notch 22. Such thinning means 28 create a "hinge" effect in the attachment ring 15, allowing greater and optimal locking, of the handgrip on the handlebars tube.

In the preferred but not exclusive embodiment illustrated in the figures, the thinning means 28 will be defined by one or more holes or slots that are blind or pass right through.

Nevertheless, it should be understood that any other configuration of the thinning means 28 can be foreseen without for this reason departing from the limitations of the scope of protection expressed by the attached claims.

The handgrip 1 also comprises a cap 29 for externally closing the hole of the handlebars tube, which can be pressure-inserted in the aforementioned hole. The cap 29 can be inserted, in an alternative embodiment, between the end 14 of the outer body 3 and/or the end of the handlebars tube and the attachment ring 15.

The present invention thus conceived can undergo numerous modifications and variants, all of which are covered by the scope of protection of the claims.

The invention claimed is:

1. A handgrip for handlebars of a bicycle or similar vehicles, comprising a tubular group extending according to an axial direction (X) corresponding to the axis of the handlebars, said group being suitable for being fitted onto an end of handlebars, at least one first padding and a second padding associated with said tubular group, means for attaching the handgrip to the handlebars, wherein said tubular group comprises an inner tubular body suitable for being fitted onto an end of the handlebars and an outer tubular body slidably fitted according to said direction (X) onto the inner tubular body, so as to adjust the axial length of the handgrip, wherein said outer tubular body comprises an end and said inner tubular body includes a neck and further comprising at least one spacer ring inserted between said neck of said inner tubular body and said end of said outer tubular body.

2. The handgrip according to claim 1, wherein said neck that determines an abutment for the axial movement of said outer tubular body.

3. The handgrip according to claim 1, further comprising gaskets between said neck of said inner tubular body and said at least one spacer ring.

4. The handgrip according to claim 1, wherein said inner tubular body and said outer tubular body comprise sliding means of matching shape suitable for avoiding a mutual rotation between said inner tubular body and said outer tubular body but at the same time allowing their mutual sliding according to said axis (X).

5. The handgrip according to claim 4, wherein said sliding means of matching shape comprise one or more matching longitudinal grooves respectively arranged on the outer cylindrical surface of said inner tubular body and on the inner cylindrical surface of said outer tubular body.

6. The handgrip according to claim 1, wherein said inner tubular body comprises, on its outer cylindrical surface, a series of cavities or holes or protuberances.

7. The handgrip according to claim 6, wherein said outer tubular body comprises, on its inner cylindrical surface, protuberances or holes matching up with said cavities or holes or protuberances suitable for giving an axial reference to portions of said outer tubular body with respect to said inner tubular body.

8. The handgrip according to claim 1, wherein said outer tubular body comprises a first tubular part, inserted onto said inner tubular body.

9. The handgrip according to claim 8, wherein said first tubular part of said outer tubular body comprises one or more shaft-shaped bodies, arranged substantially perpendicular to the surface of the tubular part of the outer tubular body suitable for decreasing the thickness of said at least one first padding and for lightening said handgrip overall.

10. The handgrip according to claim 8, wherein said first tubular part of said outer tubular body comprises one or more windows, which extend in the axial and circumferential direction.

11. The handgrip according to claim 8, wherein said outer tubular body comprises a second tubular part, with a smaller diameter than said first tubular part, suitable for being in contact internally with the tube of the handlebars of the bicycle.

12. The handgrip according to claim 11, wherein said handgrip comprises a plug for externally closing the hole of the tube of the handlebars, pressure-insertable in the aforementioned hole.

13. The handgrip according to claim 11, wherein said handgrip comprises a plug for externally closing the hole of the tube of the handlebars, inserted between said end of said outer tubular body and the end of the tube of the handlebars and said attachment ring.

14. The handgrip according to claim 1, wherein said at least one first padding comprises a widened portion, which extends radially with respect to said inner and outer tubular bodies, and is suitable for acting as an extended support for a user's hand.

15. The handgrip according to claim 1, wherein said at least one first padding comprises openings.

16. The handgrip according to claim 15, wherein said at least one second padding is positionable in said openings of said at least one first padding.

17. The handgrip according to claim 1, wherein said means for attaching the handgrip to the handlebars of the bicycle comprise an attachment ring, comprising a notch, and locking means including screw means.

18. The handgrip according to claim 17, wherein said attachment ring comprises a first inner surface and a second inner surface suitable for coupling with ends of said outer tubular body.

19. The handgrip according to claim 17, wherein said attachment ring comprises an inner protuberance insertable in a corresponding recess in said outer body.

20. The handgrip according to claim 17, wherein said attachment ring comprises thinning means, in the form of one or more holes or slots positioned in a substantially diametrically opposite position to said notch.

21. The handgrip according to claim 17, wherein said attachment ring is made from at least one of metal polymeric material, or composite materials.

22. The handgrip of claim 21, wherein the metal includes at least one of steel or aluminum, wherein the polymeric material includes at least one of thermoplastic or thermosetting materials reinforced with fibers, spheres, nano-charged materials, and wherein the composite materials include at least one of fiberglass, resin with carbon fibers or aramid fibers.

23. The handgrip according to claim 1, wherein said tubular inner body is made from at least one of a rigid material or semirigid material.

24. The handgrip according to claim 1, wherein said outer tubular body is made from at least one of a rigid material or semirigid material.

25. The handgrip according to claim 1, wherein at least one first padding is made from a hard rubber with Shore A hardness of about 50.

26. The handgrip according to claim 1, wherein said at least one second padding is made from material selected from the group consisting of a thermoplastic polymer, a gel, and non-foam or foam type materials, including thermoplastic elastomers, silicone, compact elastomeric polyurethane (PU), microcellular polyurethane, and foamed ethylvinyl acetate (EVA).

27. The handgrip according to claim 26, wherein said soft material of said at least one second padding includes at least one of continuous heterogeneous materials, discontinuous homogeneous materials, or a layer of gel arranged on top of a layer of polyurethane or ethylvinyl acetate foam.

28. The handgrip according to claim 1, wherein said at least one second padding is made in part or completely from transparent material or comprises a window of transparent material.

29. The handgrip according to claim 1, wherein said material of said at least one second padding is connected to said at least one first padding through casting or over-injection and solidification.

30. An adjustable handgrip for handlebars of a bicycle, comprising:
   a tubular group fitted onto an end of the handlebars, said tubular group extending according to an axial direction (X) corresponding to the axis of the handlebars;
   at least one first padding and a second padding associated with said tubular group,
   an attachment ring for attaching the handgrip to the handlebars, wherein said tubular group comprises an inner tubular body fitted onto an end of the handlebars and an outer tubular body slidably fitted according to said direction (X) onto the inner body, so as to adjust the axial length of the handgrip, wherein said outer tubular body comprises an end and said inner tubular body includes a neck and further comprising at least one spacer ring inserted between said neck of said inner tubular body and said end of said outer tubular body.

31. The handgrip of claim 30, wherein the neck that determines an abutment for the axial movement of said outer tubular body.

32. A handgrip for handlebars of a bicycle or similar vehicles, comprising a tubular group extending according to an axial direction (X) corresponding to the axis of the handlebars, said group being suitable for being fitted onto an end of handlebars, a first padding and a second padding associated with said tubular group, means for attaching the handgrip to the handlebars, wherein said tubular group comprises an inner tubular body suitable for being fitted onto an end of the handlebars and an outer tubular body slidably fitted according to said direction (X) onto the inner tubular body, so as to adjust the axial length of the handgrip, wherein said outer tubular body is made from a rigid material that acts as a fastener for said first padding, the first padding comprises openings and the second padding is positioned in said openings of said first padding.

* * * * *